United States Patent Office 3,477,364
Patented Nov. 11, 1969

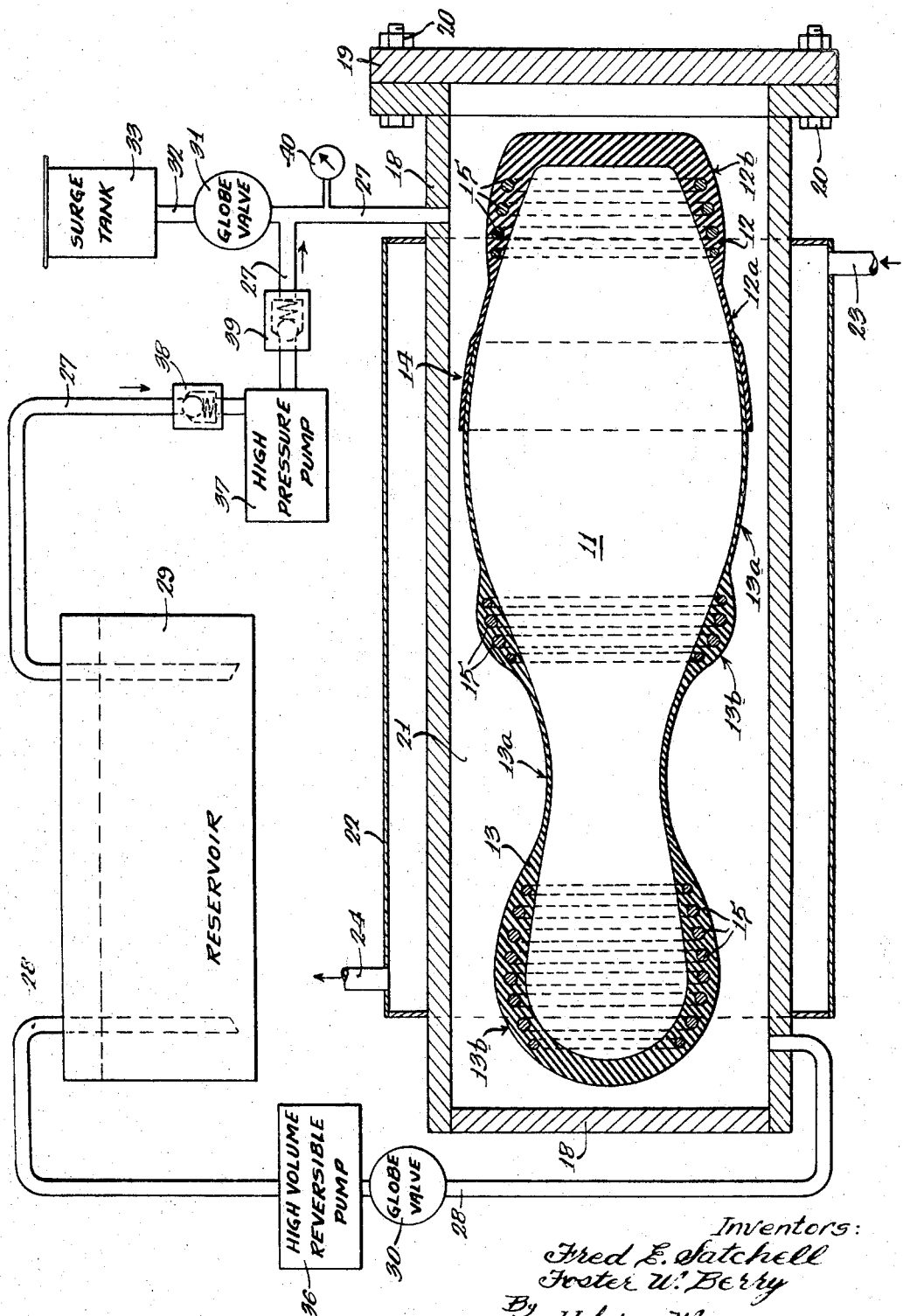

3,477,364
APPARATUS FOR DENSIFYING WOOD BOWLING PIN CORES AND OTHER ARTICLES
Fred E. Satchell, Cincinnati, Ohio, and Foster W. Berry, Muskegon, Mich., assignors to Brunswick Corporation, a corporation of Delaware
Filed Feb. 12, 1965, Ser. No. 432,193
Int. Cl. B30b 5/02; A63d 9/00
U.S. Cl. 100—93     8 Claims

ABSTRACT OF THE DISCLOSURE

Apparatus for the manufacture of densified articles such as wood bowling pin cores wherein the article is enveloped in a close-fitting flexible sleeve which is reinforced in areas not to be densified, e.g., the head, shoulder and base regions of a pin core, but is not reinforced in regions where it is desired to densify, e.g., the neck and belly regions of the pin core. The sleeve and article assembly is then placed in a jacketed pressure chamber which is then temporarily pressurized with hydraulic fluid from a reservoir of such fluid via valve and pump arrangements to densify the article at the non-reinforced portions.

THE DISCLOSURE

This invention relates to the densification of wood articles intended for use under conditions where the articles are intended to receive impact or stress resulting from impact. More particularly, this invention relates to an apparatus for the densification of such articles as wood bowling pin cores and perferably for the densification of certain areas of wood bowling pin cores, e.g. the belly and neck areas.

It has long been recognized that densification of the belly of a wood bowling pin core, as well as other impact areas such as the head, improves the life of the pin by imparting better impact resistance. More recently, it has been recognized that densification of the neck area of a bowling pin is useful in preventing or lessening tendencies of the wood pin toward checking in the neck area. With respect to densification for prevention of neck checking, attention is directed to Conklin et al. U.S. Patent No. 3,248,115, issued Apr. 26, 1966.

It is a general object of this invention to provide a new and useful apparatus for densification of wood articles such as bowling pins.

Another object is to provide an apparatus for densifying such critical areas of a wood bowling pin core as the belly and neck areas by use of direct hydraulic pressure against the areas to be densified.

Yet another object of this invention is to provide an apparatus for densification of wood in accordance with any of the foregoing objects in which hydraulic pressure is transferred through a pressure-transmitting enveloping structure to densify a wood object within the enveloping structure.

Yet another object is to provide an apparatus for densifying wood bowling pin cores and the like in which the core is enveloped in the hydraulic pressure-transmitting envelope structure, through which densification pressure can be transmitted only in the areas of the core to be densified, and the enveloped structure is placed in a pressurizing chamber which can be alternately quickly pressurized and depressurized, densification resulting from pressurizing the chamber.

The present invention further relates to a system for densifying wood in which direct hydraulic pressure is used and can be controlled in a manner effecting the desired densification.

Other objects will be apparent from the following description and drawing in which the figure is a section through a pressurizeable densification chamber and shows a flow diagram of attentive equipment in a wood densification system, illustrating a bowling pin core within an enveloping structure and disposed in the pressurizeable chamber.

While this invention is susceptible of embodiment in many different forms, there is shown in the drawing and will herein be described in detail a specific embodiment of the invention with the understanding that the present disclosure is to be considered as an exemplification of the principles of the invention and is not intended to limit the invention to the embodiment illustrated.

Turning now to the drawing, a bowling pin wood core 11, having the usual head, neck, shoulder, belly and base areas, is shown disposed within an enveloping member provided by a pair of sleeve members 12 and 13, e.g. of rubber or the like, enclosing the bottom and top of the pin core respectively and overlapping at 14. The sleeve members 12 and 13 completely encapsulate the wood core and include thin portions 12a and 13a at the areas of the core desired to be densified, i.e. in the belly and neck areas of the illustrated pin core, and thick portions 12b and 13b which resist transmission of hydraulic force at other areas of the core. The thin portions 12a and 13a are preferably of a smaller diameter than the pin core, are resilient and are stretchable to expand over the pin core when the core is placed within the enveloping structure. Thus, the contracting tendencies of the thinner hydraulic force-transmitting portions 12a and 13a will assist hydraulic force from outside of the enveloping structure in densifying the areas of the core covered by the force-transmitting portions.

The thicker portions 12b and 13b are comparatively rigid, e.g. of thicker rubber, and are provided with a reinforcing structure in the form of internal spirally wound solid steel wire 15, which assists in resisting forces of hydraulic pressure from outside the envelope structure. Of course, steel cables or other materials such as fiberglass and the like can be used in lieu of or in addition to the illustrated steel wire.

The illustrated system includes container 18 having pressure-resistant walls of steel or the like and an outwardly flanged open end over which a cover plate 19 is removably secured by bolts 20 to seal the open end of container 18 and form a pressurizable chamber 21. Gaskets or other sealing means may be used if desired between cover plate 19 and the outwardly flanged open end of container 18.

Surrounding container 18 is a heating or cooling jacket 22 having an inlet 23 for receiving heating or cooling fluids and an outlet 24 for discharge of fluids.

Communicating with the interior of pressurizable chamber 21 are a pair of pressure lines 27 extending to a reservoir tank 29 containing a body of hydraulic fluid. An on-off valve 30 is provided in line 28, and another on-off valve 31 is provided in a pressure line 32 extending from line 27 to a surge tank 33. A high volume reversible pump 36 is provided in line 28 between valve 30 and reservoir 29; and a high pressure pump 37 is provided in line 27 between line 32 and reservoir 29. Check valves 38 and 39, on either side of pump 37, check back-flow from chamber 21 to reservoir 29. A pressure gauge 40 communicates with line 27 for measuring the pressure of hydraulic fluid supplied to pressurizable chamber 21.

Prior to being placed within the enveloping structure, the bowling pin core 11 is turned to size by either rough or finished turning. During turning the pin is oversized in the areas where densification is desired, i.e. oversized from the desired final pin core configuration. Such oversize may be an oversize from normal pin core configuration or may be the same as normal pin core configuration where additional coating or other material will be added to the core in the densified areas to bring the core up to desired or regulation size during a coating operation.

The bottom and top portions 12 and 13 of the enveloping structure are then placed over the core from the ends of the core, portions 12a and 13a being stretched. The resulting encapsulated core is placed in chamber 21, and cover 19 is sealed. Valves 30 and 31 are open at the start of the cycle of operation of the system, and high volume pump 36 is started to transfer fluid from reservoir 29 to pressurizeable chamber 21 through line 28. When chamber 21 is filled, fluid flows through line 27, is blocked by check valve 39 and flows through valve 31 and line 32 until fluid shows in surge tank 33 at which time valves 30 and 31 are closed. Heating fluid is introduced through inlet 23 to bring chamber 21 to the desired temperature.

Pump 36 is stopped and high pressure pump 37 is started to pump liquid from reservoir 29 through line 27 to pressurizeable chamber 21. Pumping by pump 37 is controlled to provide the desired pressure at gauge 40, e.g. by turning off when the pressure is reached. Pressure in chamber 21 is maintained for the proper length of time to effect the desired densification. The hydraulic fluid pressure in chamber 21 is transmitted through envelope portions 12a and 12b to densify the wood in the belly and neck areas covered by portions 12a and 12b, but the fluid does not contact the bowling pin core 11 and is not compressed into the core.

After the desired densification, globe valve 30 is opened, and pump 36 is reversed and started to pump fluid from pressurizeable chamber 21 back into reservoir 29 while globe valve 31 is opened to drain surge tank 33 and vent pressurizeable chamber 21. Flow of heating fluid through jacket 22 can be stopped whenever desired. After the fluid has been pumped through line 28 back to reservoir 29, cover plate 19 is removed, the enveloped pin is removed from chamber 21 and the sleeve members 12 and 13 are stripped from the pin core to recover the resulting densified core.

Although the sleeve members 12 and 13 have been described as having been made of rubber, other materials may be used in lieu thereof. The amount of densification may depend to some extent on the material used, its thickness, flexibility, etc., since different materials and thicknesses may provide different degrees of force transmission to the core. The amount or degree of densification may also depend on the temperature and pressure involved, higher temperatures and pressures usually providing greater amounts of densification. However, it has been found that, with sufficient pressure for the densification, temperatures can vary widely and are not critical except that temperatures that would destroy the hydraulic fluid, the material of envelope portions 12 and 13, or the wood pin core should not be used. Temperatures ranging from 140–320° F. have been found to be useful when pressures from 100–1100 p.s.i.g. are used. Of course, the longer time the pin core is subjected to the temperature and pressure the greater will be the densification. Thus, it is only necessary to subject the core to a temperature and pressure and for a time sufficient to effect the desired densification.

The nature of the hydraulic medium is by no means critical, and usable hydraulic media include oil, water, steam, Dowtherm, and the like. However, the most practical medium and preferred medium is water because of its availability, its nonflammable nature, and its ease of removal from the pin core in case of contamination, and the temperature used may be sufficiently high that the water flashes off of the envelope when valve 31 is opened to vent chamber 21 to atmosphere.

As has been indicated, the jacket 22 can be used for either heating or cooling. The cooling by jacket 22 is for the purpose of bringing fluid in chamber 21 below its boiling point should the process be conducted at temperatures above the hydraulic fluid boiling point. Under such conditions, the fluid in chamber 21 is cooled below its boiling point before opening of valve 30 to return the fluid to reservoir 29. Alternatively, a suitable surge tank or other means can be provided between line 28 and reservoir 29 to receive and recover the hydraulic fluid released from chamber 21 at higher than boiling temperatures and for returning recovered water to reservoir 29.

Normal heat exchange fluids may be used from an in-line heater connecting lines 23 and 24, and cooling fluid may be provided by an in-line cooling unit connecting lines 23 and 24. Suitable valve means for alternating use of heating fluids and cooling fluids will be apparent to those in the art. Although an external heat exchange jacket is shown, the heating or cooling of chamber 21 may be by any means desired, e.g. coils or immersion heaters or coolers within chamber 21, direct gas flame heating, etc. High capacity heating is desirable to shorten the cycle of operation of the system.

As a specific example, a maple pin core is turned to size, but slightly oversized in the belly and neck areas. The enveloping sleeves 12 and 13 are placed over the pin, and the pin is placed in chamber 21 as described above; the densification cycle is initiated by pumping water from reservoir 29 to fill chamber 21. During the cycle heating fluid is circulated through jacket 22 to bring the temperature up to 250° F., and the chamber 21 is pressurized to a pressure of 650 p.s.i.g. by pump 37. The densification cycle is continued and concluded as described above. Before opening valve 30, cooling fluid is circulated through jacket 22 to cool chamber 21 to a temperature of about 200° F. The recovered pin has been noticeably densified in both the belly and neck areas.

It is an advantage of the present system that hydraulic force is transmitted directly to the areas of the wood article to be densified, i.e. through a force-transmitting member covering the article. Additionally, the article can be masked with a rigid structure in areas where densification is not desired, resulting in localized densification. The use of hydraulic pressure for compressing the wood fibers eliminates the need for dies or other such mechanical contrivances. The medium is capable of conducting externally applied heat to the article being densified, if required, and has the distinct advantage of accommodating irregular objects or objects of varying sizes. In the preferred form, the two-pieced enveloping structure is used for controlling the location and degree of densification; further, the use of the envelope in efficient and prevents or at least greatly lessens contamination of a wood article by the hydraulic medium so that a wider variety of hydraulic media are usable.

It is a further advantage of the present system that densification in the resulting densified article varies in the radial direction, being at a maximum at and near the surface of the article and decreasing to normal densification toward the interior of the article. Such gradient in densification provides maximum effectiveness with respect to impact resistance and prevention of bowling pin neck checking, with minimum addition of weight. The gradient also results in optimum retention of the flexural and rebound properties of the wood, consequently negating influence of densification on scoring while markedly upgrading the durability of the pin.

We claim:

1. Apparatus for use in the densification of an article, which apparatus comprises means defining a pressurizeable chamber for receiving and containing the article and for containing hydraulic fluid surrounding the article, means for supplying hydraulic fluid to said chamber, means for pressurizing hydraulic fluid in said chamber and means separate from said supplying and pressurizing means for heating hydraulic fluid in said chamber.

2. The apparatus of claim 1 including a hydraulic force-transmitting envelope shaped for receiving and enclosing the article within said pressurizable chamber and sealing the article from contact with the hydraulic fluid while permitting transmission of force from the hydraulic fluid through said envelope to the article.

3. Apparatus for use in the densification of an article, which apparatus comprises hydraulic force-transmitting envelope means for tightly enclosing the article, means defining a pressure resistant container for receiving and containing the article enclosed in said envelope means, means for containing a supply of hydraulic fluid, means for directing fluid from said supply to said chamber and return, means for pressurizing fluid in said chamber, and valve and surge tank means for venting said chamber during return of fluid from said chamber to said supply containing means.

4. Apparatus for use in the densification of a wood core for a bowling pin intended to be used under conditions in which the wood core receives impact from a bowling ball, which apparatus comprises envelope means of a shape for enclosing the wood core, means defining a pressurizeable chamber for containing the wood core enclosed in said envelope means and for containing hydraulic fluid surrounding the enveloped wood core, and means for pressurizing hydraulic fluid in said chamber, said envelope means comprising a hydraulic force-transmitting wall portion in the pin core belly or neck region and a hydraulic force-resisting portion in the head, shoulder or base region.

5. The apparatus of claim 4 wherein said envelope means comprises a plurality of members for completely enclosing and tightly sealing the wood core and having a flexible structure in the hydraulic force-transmitting wall portion and a rigid structure throughout the remainder of said envelope means.

6. An apparatus for use in the densification of an article, which apparatus comprises envelope means for enclosing the article, means defining a pressurizeable chamber for containing the article enclosed in said envelope means and for containing hydraulic fluid surrounding the enveloped article, and means for pressurizing hydraulic fluid in said chamber, said envelope means comprising sleeve means having a wall including a hydraulic force-transmitting portion for covering the area of the article to be densified and means embedded in the sleeve wall defining a hydraulic force-resisting portion.

7. An apparatus for use in the densification of a wood core for a bowling pin intended to be used under conditions in which the wood core receives impact from a bowling ball, which apparatus, comprises envelope means for enclosing the wood core, means defining a pressurizeable chamber for containing the wood core enclosed in said envelope means and for containing hydraulic fluid surrounding the enveloped wood core, and means for pressurizing hydraulic fluid in said chamber, said envelope means comprising a plurality of members for completely enclosing and tightly sealing the wood core and having a flexible structure of a resilient composition defining a hydraulic force-transmitting portion and a rigid structure throughout the remainder of the envelope means, said envelope means being smaller in inside diameter at the flexible portion than the outside diameter of the corresponding portion of the bowling pin core, whereby the flexible portion of the envelope can be stretched over the pin core to contact and urge against the outer surface of the pin core in the area to be densified.

8. Apparatus for use in the densification of a wood core for a bowling pin intended to be used under conditions in which the wood core receives impact in the belly region from a bowling ball, which apparatus comprises sleeve means for enveloping the core and including hydraulic force-transmitting areas for covering the belly and neck regions of the pin core, wall means defining a pressure resistant container for containing the enveloped pin core and having an opening for receiving the enveloped core, cover means for closing and sealing said opening, means for removably securing said cover means to said wall means in a position closing and sealing said opening, thereby forming a pressurizeable chamber within said container for containing hydraulic fluid under pressure, jacket means on said container for heating or cooling said container and hydraulic fluid within said chamber by heat exchange, first and second conduit means communicating at one end through said container wall with the interior of said chamber, reservoir means communicating with the other end of each of said conduits, valve means in the first of said conduits for selectively blocking and unblocking flow therethrough, high volume reversible pump means in the first of said conduits, pressure gauge means in the second of said conduits, high pressure pump means in the second of said conduits, check valve means in the second of said conduits for checking flow in the direction from said pressurizeable chamber to said reservoir, a third conduit communicating at one end with said second conduit between said high pressure pump means and said pressurizeable chamber, a surge tank communicating with the other end of said third conduit, and valve means in said third conduit for selectively blocking and unblocking flow therethrough.

References Cited

UNITED STATES PATENTS

| 1,914,392 | 6/1933 | Worrall | 100—90 |
| 2,489,643 | 11/1949 | Hunter. | |
| 2,562,807 | 7/1951 | McKenzie. | |
| 2,652,081 | 9/1953 | Curtis | 273—82 X |
| 3,024,819 | 3/1962 | Dosker | 273—82 X |
| 3,065,966 | 11/1962 | Egbert | 273—82 |
| 3,248,115 | 4/1966 | Conklin et al. | 273—82 |
| 3,300,214 | 1/1967 | Nichols | 273—82 |
| 3,138,380 | 6/1964 | Satchell et al. | 273—82 |
| 3,147,975 | 9/1964 | Gruss et al. | |
| 3,159,402 | 12/1964 | Nichols | 273—82 |

BILLY J. WILHITE, Primary Examiner

U.S. Cl. X.R.

100—211; 144—321; 264—88; 273—82